Oct. 31, 1944. S. I. LINDELL 2,361,638
ELECTRICAL FUSE
Filed March 23, 1936 7 Sheets-Sheet 1
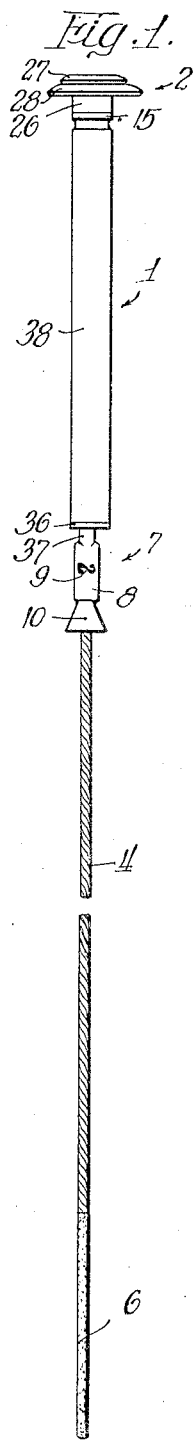
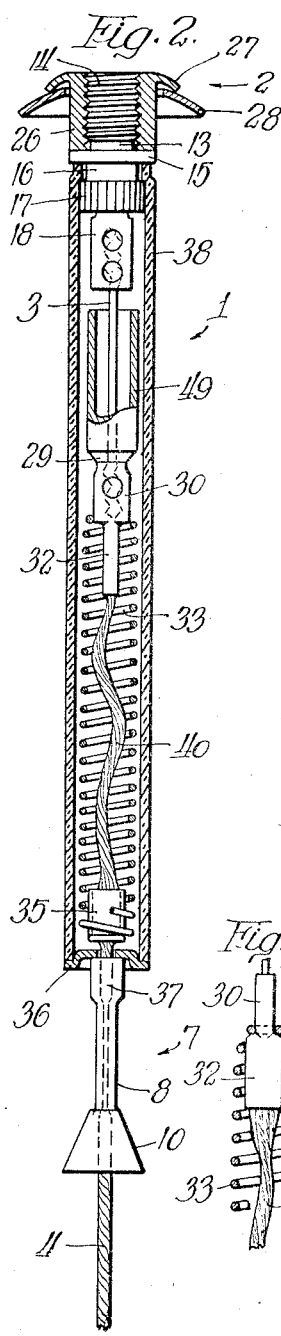
Inventor:
Sigurd I. Lindell.

Oct. 31, 1944.   S. I. LINDELL   2,361,638
ELECTRICAL FUSE
Filed March 23, 1936    7 Sheets-Sheet 2

Inventor:
Sigurd I. Lindell
By Brown Jackson Boettcher Dienner
Attys.

Oct. 31, 1944. S. I. LINDELL 2,361,638
ELECTRICAL FUSE
Filed March 23, 1936 7 Sheets-Sheet 3
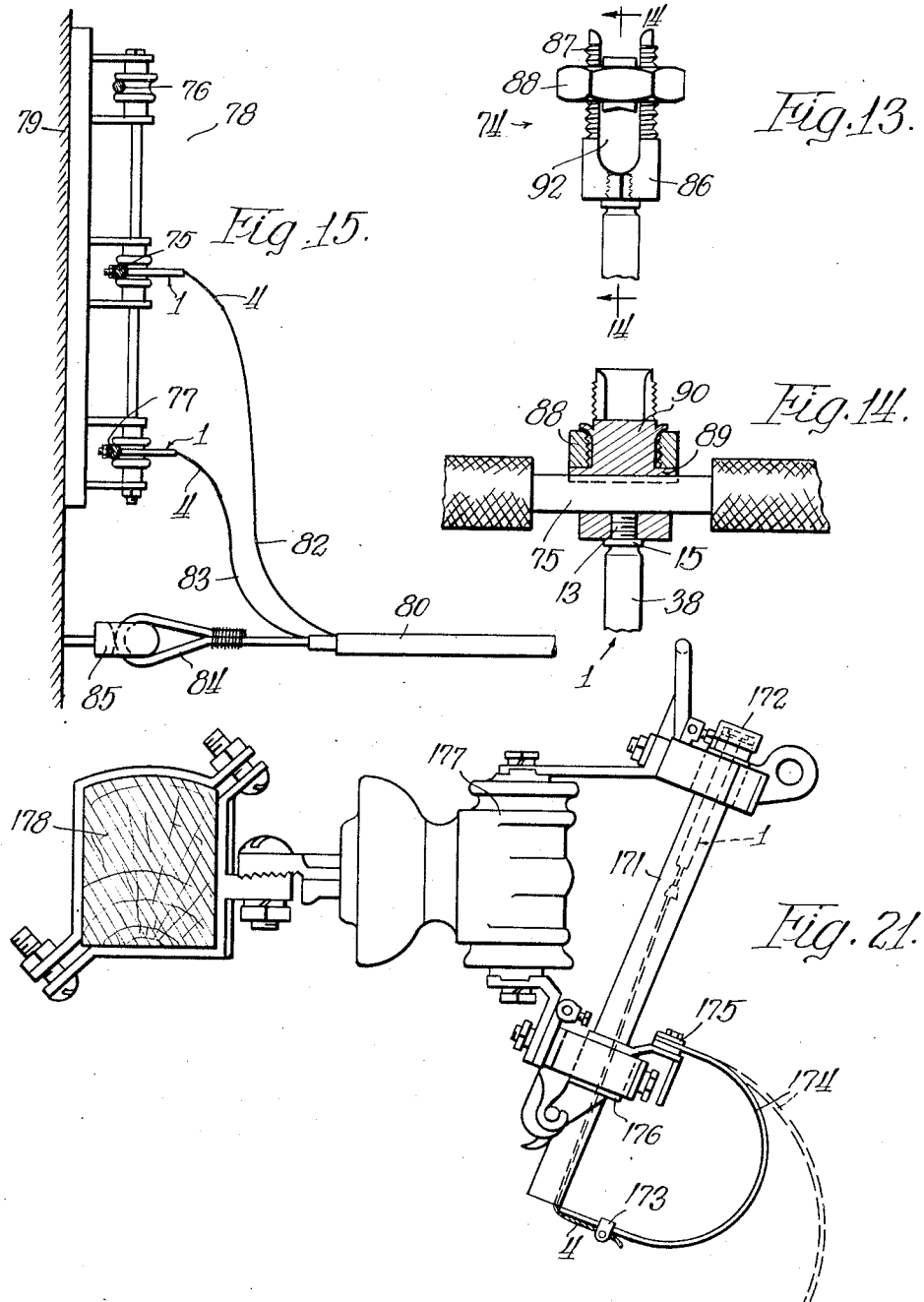

Oct. 31, 1944.   S. I. LINDELL   2,361,638
ELECTRICAL FUSE
Filed March 23, 1936   7 Sheets-Sheet 4

Inventor:
Sigurd I. Lindell.
By Mason Jackson Boettcher Brenner
Attys.

Oct. 31, 1944.  S. I. LINDELL  2,361,638
ELECTRICAL FUSE
Filed March 23, 1936  7 Sheets-Sheet 5

Inventor:
Sigurd I Lindell.

Oct. 31, 1944. S. I. LINDELL 2,361,638
ELECTRICAL FUSE
Filed March 23, 1936 7 Sheets-Sheet 6
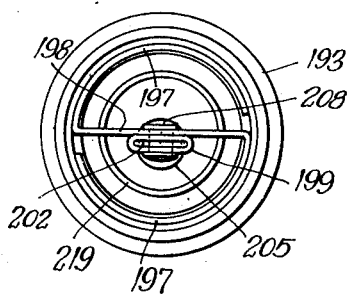
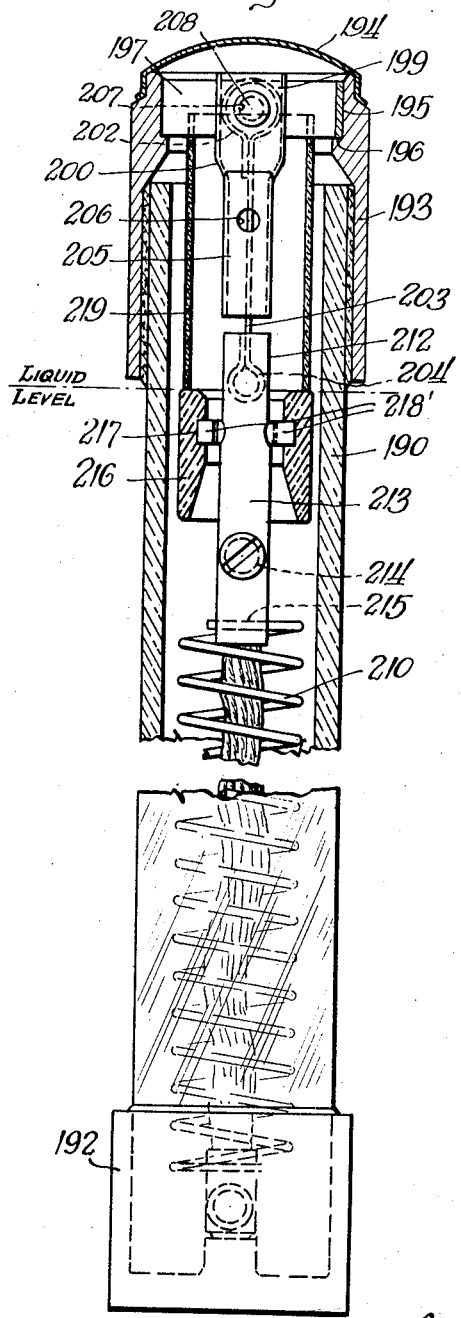
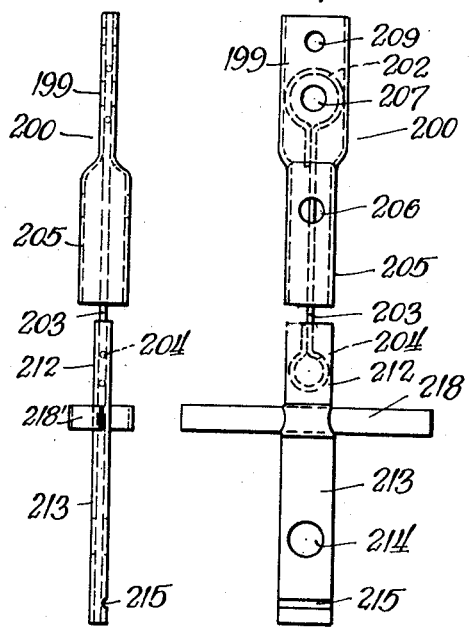
Inventor:
Sigurd I. Lindell
By
Attys.

Oct. 31, 1944. S. I. LINDELL 2,361,638
ELECTRICAL FUSE
Filed March 23, 1936 7 Sheets-Sheet 7
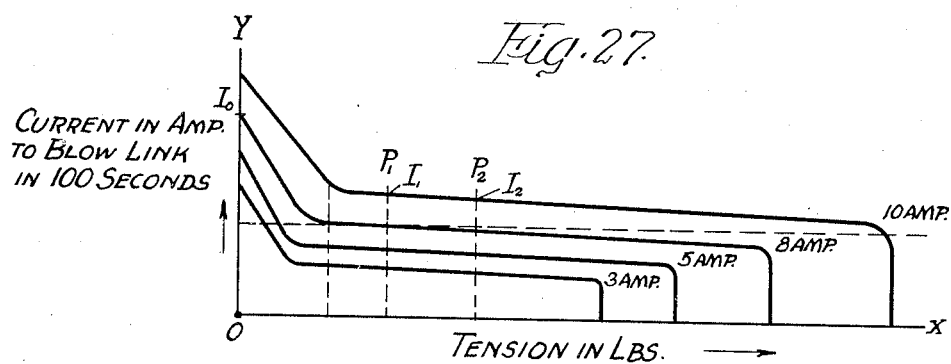
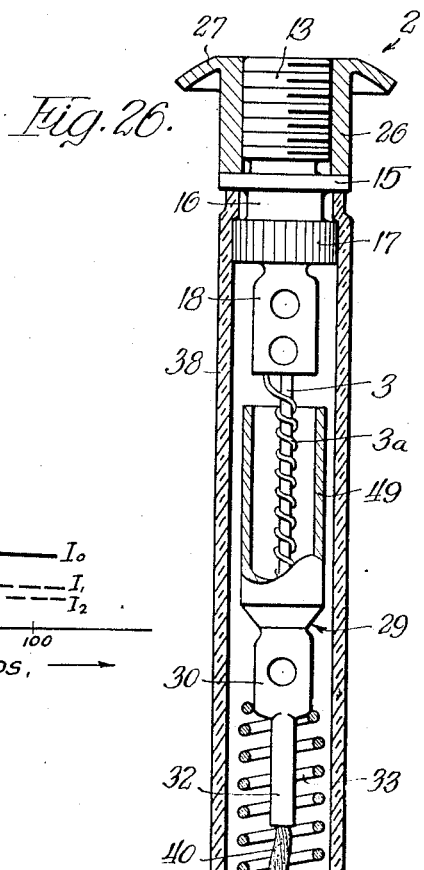
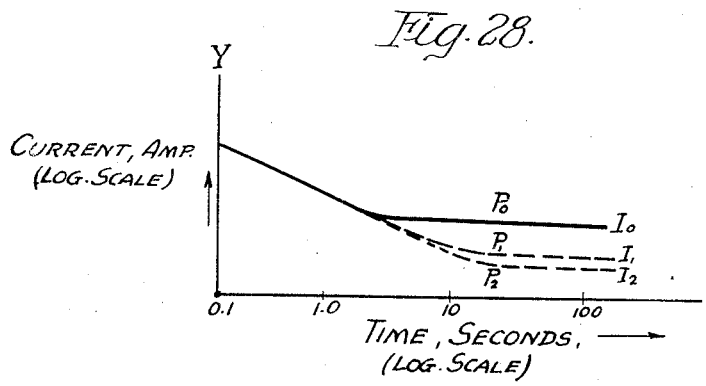
Inventor
Sigurd I. Lindell Patented Oct. 31, 1944

2,361,638

UNITED STATES PATENT OFFICE 2,361,638

ELECTRICAL FUSE

Sigurd I. Lindell, Chicago, Ill., assignor to Schweitzer & Conrad, Inc., Chicago, Ill., a corporation of Delaware Application March 23, 1936, Serial No. 70,280

69 Claims. (Cl. 200—117)

My invention relates generally to electrical circuit opening devices and it has particular relation to fuses.

While the present invention is particularly applicable to fuses of low capacity, i. e. of the order of ten amperes or less, the invention is not to be limited to such low capacity fuses, since the teachings of the present invention have application to capacities of any desired value. The invention disclosed herein relates to certain of the subject matter disclosed in the copending application of Hugh A. Triplett, Serial No. 758,372, filed December 20, 1934, and assigned to the assignee of this application.

Fuses are commonly used in preference to the more expensive relay controlled circuit breakers for the purpose of isolating branches of high tension feeder circuits in the event of heavy overloads or short circuits, especially in sparsely populated districts where light loads are supplied and the revenue is small. Ordinarily, the load current is very low in such installations and the current required to be interrupted by a fuse on short circuit is rather limited, because of the high impedance between the point of fault and the generating source. This is particularly true where fuses are applied on the primary side of a small distribution transformer, the impedance of which is usually sufficient to limit the primary current to a few amperes in the event of secondary short circuit.

It is obvious that the fuses used under such conditions must be capable of being blown by low currents and that their time-current blowing characteristics must be dependable and permit of rather accurate coordination with the available blowing currents in such particular installations. Also, it is required that the fuses be capable of interrupting low currents without prolonged arcing in order not to impair the protected equipment or the further use of the fuse receptacle.

Air break fuses of the expulsion type are frequently employed in such installations. A typical embodiment comprises a fibrous insulating tube with a metal ferrule at each end constituting terminals for a renewable fuse link. Usually, one end of the tube assembly is closed and the fusible section of the link is positioned at this end. The fusing of the link by overcurrent is intended to suddenly create a sufficient volume of vapor and gases to expel one of the terminals of the fuse link from the insulating tube, thus lengthening the arc and interrupting the current flow, with a minimum of arc duration and attendant erosion or destruction of the tube or fuse link receptacle.

Experience has shown, however, that the plain expulsion fuse, as ordinarily dimensioned and constructed, and to be found in great numbers on distribution systems, although it is capable of generating sufficient gas pressure to expel one terminal and interrupt a heavy overload promptly, frequently fails to cope with currents of limited magnitude. For this reason, mechanical means have been incorporated in more recent designs to initiate the lengthening of the arc upon the blowing of the fusible section. These means impose mechanical tension upon the fusible section and the amount of this tension varies appreciably in various makes of cutouts and may run from 1 or 2 lbs. to 10 lbs.

In certain fuses of this general type, the fusible link has comprised a plain current calibrated fusible section which is placed directly in tension as by a spring, weight or the like. In such combination, the fusible section does not actually fuse upon the occurrence of relatively light blowing currents, but ruptures before the melting point has been reached, and the time-current characteristic depends not only upon the link but also upon the tension imposed upon it by the particular fuse assembly in which the link is applied, and may vary greatly.

Another embodiment is found in the patent to Conrad, No. 1,446,423. In his device, a high resistance strain wire has been applied in parallel with the fusible section proper, to relieve the latter of the mechanical tension imposed on the link assembly by the actuating spring. This renders the time-current characteristic practically independent of whatever tension may be imposed on the link, in the case of fuse links of comparatively high current rating where the current carrying capacity of the strain wire can be made negligible as compared with the fusible section proper.

Now it is apparent that a fuse link, in order to be universally applicable in various makes of fuse receptacles or cutouts, must possess a minimum tensile strength to provide a margin above the highest mechanical tension imposed by any cutout in common use, and to withstand the tension that may be imposed by a lineman during the process of re-fusing a cutout. I have found that in low current links of ratings up to 10 amperes, any strain member, capable of meeting this condition, possesses sufficient current carrying capacity in itself to make it impossible to use a parallel fusible section for the purpose of rendering the time-current characteristic independent of the mechanical tension that might be imposed.

I find that for fuses of small current carrying capacity, that is, of the order of 10 amperes or less, and for voltages of the order employed on the primary sides of distribution transformers, a high tensile strength wire is preferably employed for the fusible element. A suitable wire for this purpose is "Chromel A" or "Nichrome V," both consisting of a nickel chromium alloy of high melting point.

When such a high tensile strength wire is employed as the fuse link, a relatively high temperature is required to cause it to part. Thus, under normal operating conditions, and particularly under overload conditions, the temperature of the fuse wire may be raised to a relatively high value. As a result, due to the heat thrown off by the fuse wire, the fiber tube enclosing the fusible section and even the fibrous lining of the tubular receptacle in which the link is placed, may be severely charred. In some instances the tube or sleeve surrounding the fuse link has been so severely charred that it has been necessary to renew not only the fuse link but also the sleeve or tube housing it. To overcome the disadvantages of a fuse element which may stand at relatively high temperature and thus tend to damage the surrounding sleeve of fiber or the like, and to avoid the effects of corona, I provide a corona and heat radiating element adjacent the fuse element which, by conducting the heat to a rather extended surface, reduces the intensity to a point where temperature will not build up dangerously and, due to its shape, avoids corona discharge of high voltages.

This same structure of a thermoshield surface in the preferred embodiment of my invention has another very important function, namely, that of providing a spark gap in shunt with the fusible element whereby high voltage disturbances of the type designated as surges or steep wave front impulses or impulse voltages may pass through the device without traversing the fusible element. This surge protection feature is applicable not only to air type fuses but also to liquid type fuses, or, in fact, any form of fuse subject to disturbances of the aforesaid type.

The principal object of my invention is to provide a simple, efficient, low-current fuse link, which may be readily and economically manufactured, and which will have an independent, accurate, predetermined time-current characteristic, and sufficient mechanical strength to make it universally suitable for application in commercially available high-tension fuse devices.

An important object of my invention is to provide for applying a predetermined non-cumulative tension to a fusible member, regardless of the manner in which it is installed for operation.

Another object of my invention is to provide for prestressing a fuse link prior to installation in an electrical circuit to an extent which is generally greater than it would later be stressed under normal operating conditions by the mounting in which it is placed; and to base said prestressing upon the peculiarly advantageous relationship which will be shown to exist between the minimum fusing current and the imposed stress, so that slight deviations from the selected stress will not materially alter the fusing characteristic of the link, yet retaining a reasonable factor of safety between the ultimate tensile strength of the link and the tensile load.

Another important object of my invention is to provide for shielding the inner surface of a fuse receptacle or tube from the heat which would otherwise be applied thereto from the fuse member mounted therein.

A further object of my invention is to provide for mounting a fuse under different operating conditions, depending upon the type of mounting receptacle in which it is to be applied.

Another object of my invention is to provide a fusible element having a greatly increased ability to withstand steep wave front, transient currents of great magnitude but very short duration, as for example, surges produced in overhead distribution lines by lightning.

Other objects of my invention will in part be obvious and in part appear hereinafter.

My invention, accordingly, is disclosed in the embodiments hereof shown in the accompanying drawings and comprises the features of construction, combination of elements and arrangement of parts which will be exemplified in the constructions hereinafter set forth and the scope of the application of which will be indicated in the appended claims.

For a more complete understanding of the nature and scope of my invention, reference may be had to the following detailed description, taken in connection with the accompanying drawings, in which:

Figure 1 is a view in side elevation showing a fuse link constructed in accordance with my invention and assembled for installation in a fuse receptacle;

Figure 2 is a sectional view showing the details of construction of a prestressed fuse link provided with a shield;

Figure 2A is a sectional view showing the construction of the shield;

Figures 2B and 2C show the manner in which the prestressing spring may be attached to the lower fuse link terminal fitting, Figure 2C being enlarged;

Figure 3 is a view in side elevation of a fuse installed in a mounting device;

Figures 13 and 14 are views of a type of connector which may be used for applying the fuse link shown in Figures 1 and 2 to a power line;

Figure 15 is a view in side elevation of a fuse device applied, using the connector shown in Figures 13 and 14;

Figures 16, 17, 18, 19, 20 and 21 are views showing various forms of application of my novel fuse to different types of fuse mounting;

Figure 22 is a longitudinal section through the upper end of a liquid filled fuse embodying my invention;

Figure 23 is a fragmentary front elevation of the fuse and terminal assembly before mounting the same in the device of Figure 22;

Figure 24 is an edge view of the assembly shown in Figure 23;

Figure 25 is a top plan view of the terminal employed in the device of Figure 22;

Figure 26 is a sectional view, similar to Figure 2, showing the radiation shield applied to a fuse having both strain and fuse elements; and Figures 27 and 28 show a number of curves which demonstrate certain characteristics possessed by fuses constructed in accordance with my invention.

Figure 4:
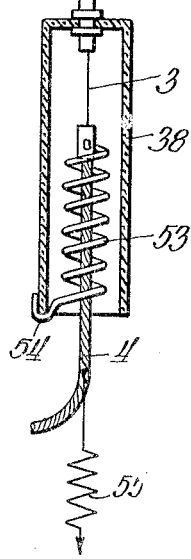
Figures 4, 5, 6 and 7 are sectional views illustrating the principle of operation of the prestressed fuse link.

According to my invention I have provided for prestressing in a non-cumulative manner the tension wire forming the fusible element of a fuse. The internal stress which is applied on assembly to the fuse element is usually greater than any stress which will ordinarily be applied to the link later, on installation. As a result, regardless of the type of fuse mounting, or the different tensions which may be externally applied by different operators or linemen, substantially the same tension will always be applied to the fusible element. As a result, the time of operation of a particular link as a function of blowing current will remain substantially fixed, since the same or substantially the same stress will always be applied thereto. For this reason, under a given overload, the fuse will operate within a predetermined time interval which will always be substantially independent of the type or manner of installation.

In order to prevent charring of the inside of the tube or sleeve of insulation which normally is used to house the fuse element and to avoid the effects of corona, I have provided a cylindrical shield which is fixedly secured to one of the terminals of the fuse link and extends along the fuse link, substantially concentric therewith. The shield is formed of a material having a relatively high heat conductivity, such as copper or aluminum, and as a result the heat which would normally be radiated or conducted to the inner surface of the insulating sleeve is absorbed by the shield and conducted thereby to other metallic parts of the fuse assembly, with the result that there is no concentration of heat in the vicinity of the fuse link, or charring of the insulating tube surrounding it.

With a view to providing a universal mounting for the prestressed fuse, an adaptor has been provided having knock-out portions disposed at different positions. Depending upon the type of fuse mounting, different knock-out portions may be removed to adapt the fuse for mounting in different fuse receptacles which are already in use.

Referring now particularly to Fgures 1, 2 and 3 of the drawings, it will be observed that a fuse link 1 comprises three essential elements; first, a terminal portion 2, such as is suitable for attachment to one electric terminal and support; second, a fusible section or wire 3; and, third, a flexible lead and terminal portion 4 for making connection with another electric conductor with which the link is to be connected in series. The wire 3 is preferably a high tensile strength wire, of high melting point, for ampere ratings of small value. Since the spring tension to which it is subjected is of the order of six pounds it can be seen that a small diameter wire of soft metal alone is not suitable for my purpose. The portions 2 and 4 are preferably adjustable to meet various conditions of mounting, as I shall describe in detail hereinafter. The fuse link 1 is preferably enclosed in a housing such as the fuse tube 5 shown in Figure 3 of the drawings. A more detailed description of the manner in which the fuse link 1 is mounted in the fuse tube 5 will be set forth hereinafter. The flexible lead of terminal portion 4 comprises a stranded copper or the like conductor, the outer end of which, as shown at 6, is tinned, to hold the strands together and which is provided also with a collar member 7. The collar member 7 is provided with an intermediate portion 8 which is pinched or flattened upon the body of the lead 4 and stamped with the ampere rating, as indicated at 9, and further is provided with a flared or conical wedging contact 10 for engagement in a cooperating stationary wedging contact member, as indicated at 12, in Figure 3.

The upper terminal member 2 comprises a cylindrical stud member 13 the outer end of which is threaded at 14. The intermediate portion comprises a flange 15 which may represent the original diameter of the stock from which the stud is cut, as by a screw machine. Adjacent the flange 15 there is a groove 16 and beneath the same a knurled portion 17. The inner end of the stud 13 comprises a tubular socket portion 18 into which is inserted the upper end of the fusible wire 3. In order to hold the fusible wire 3, the collapsible socket portion 18 is pinched flat upon the corrugated or otherwise deformed ends thereof. The corrugations assist the friction in sustaining the tension imposed on the strain wire so that full tensile strength of said wire may be developed in a short connection. The stud 13 is provided with a flanged head 26 the upper end of which is flanged or flared out as indicated at 27 as by a spinning operation. When the annular seat is of greater extent than would be suitably engaged by the flange 27, a dished washer 28 is provided.

The lower end of the fusible wire 3 is secured, as illustrated, in a shield fitting 29, shown in section in Figure 2A, which comprises two retaining parts, namely, 30 and 32. It will be observed that the lower end of the fusible wire 3 is gripped in the part 30 of the shield fitting 29. This fitting 29 therefore forms a coupling or junction member between the lower end of the fusible element 3 and the lead 4. It also forms an anchorage for the tension spring 33, which has its upper coil flattened against the flat sides of the pinched socket 30 and is prevented from disengagement by the shoulders of the flattened part of the socket 32, since the flattened portions of the sockets 30 and 32 are so disposed that their planes are substantially at right angles with each other. The spring has its opposite end anchored by the lower end turn, which is collapsed to embrace the cable below the flattened collar 35, which is pinched upon the flexible lead 4 at a point which permits a slight slack portion 40 in the lead 4 to permit a slight amount of lost motion between the remainder of the lead 4 and the fitting 29. Indirectly, the spring 33 is anchored to the cap or plate 36 through the medium of the fitting 7, which has its adjacent end 37 in engagement with the plate or cap 36. The margin of the plate or cap 36 is so formed as to center it upon the lower end of a fiber tube or sleeve 38. The upper end of the tube 38 is securely bound to the upper terminal stud 13 in axial alignment therewith and rigid for both rotary and axial motion with respect thereto. This engagement is secured preferably by wetting the end of the fiber tube 38, pushing it over the knurled portion 17, and then shrinking the end into the groove under the flange 15. Such shrinkage may be facilitated by pinching.

It will further be observed that the shield fitting 29 has an integrally formed metal radiation shield 49, Figures 2 and 2A, which is adapted to surround the major part of the fusible wire 3 that constitutes the fuse link. The shield 49 comprises an enlarged tubular portion which is adapted to loosely surround the fusible wire 3 and to lie in axial alignment therewith but out of contact with the inner wall of the fiber tube 38 in which it is contained. The small gap between the shield 49 and the upper terminal 18 prevents shunting of the fuse wire 3 but permits static or steep wave front discharges to occur substantially from the terminal 18 to the radiation shield 49 without traversing the wire 3. Thus, sharp static overloads, which might otherwise cause blowing of the fuse unnecessarily, are ineffective to cause such operation.

As shown in Figure 26, the wire 3 may be shunted by means of a conductor 3a forming a more readily fusible element and composed preferably of silver, although other low resistance metals or alloys may be used instead. The conductor 3a may be wound in contact engagement with the surface of the wire 3, which here is employed principally as a strain wire, and the shield 49 may be provided in the same manner and for the same purpose as shown in Figure 2 of the drawings and described herein.

Referring to Figure 2B of the drawings, it will be observed that the fitting 29 has been modified by the omission of the shield 49 to form the fitting 29b, which is otherwise identical therewith. The top convolution of the spring 33 is flattened out to closely engage the retaining part 39, as shown in the top view of the assembly in Figure 2C. The required slack in the lead 4 for the slack portion 40 is obtained by untwisting the portion of the lead that is connected to the fitting 29b. The amount of untwisting determines the amount of slack which should be maintained at a predetermined value for proper operation. Therefore, the ends of the slack portion 40 or the fitting 29b and the collar 35 attached thereto must be prevented from rotating relative to each other, due either to the natural tendency of the slack portion 40 to return to its normal position or to any external twist which may be applied to the other end of the lead 4. This is effected by non-rotatively clamping the top and bottom of the spring 33 to the fitting 29b and the collar 35, respectively, which in turn are collapsed on the lead 4. It will be understood, of course, that this manner of construction is also used in the connection of the spring 33 to the shield fitting 29.

When the current flow through the wire 3 becomes an appreciable amount, the heat given off thereby may be considerable, particularly as it may accumulate, if not otherwise dissipated. It is very important to maintain tension upon the fuse at all times, and since the support for the spring 33 rests upon the end of the fiber tube 38, it is necessary to insure the life and permanency of the tube 38.

As a further result of the provision of the relatively large diameter shield 49 about the relatively small diameter wire 3, the effects of corona are materially reduced. This is due to the fact that the effective diameter of the wire 3 is greatly increased by the shield 49 and there is consequently less ionization of the atmosphere in the vicinity of the wire 3.

In fuses constructed as shown in Figure 2 of the drawings, employing the nickel-chromium wire 3, the temperature of the fusible section may reach from 800° to 900° C. before the link blows. At these temperatures sufficient heat may be transmitted by radiation to the surrounding fiber tube 38, during prolonged overloads approaching the minimum fusing current, to injure, and possibly cause collapse of the walls of the tube. This would result in a modification of the predetermined minimum tension and a change in the characteristics of operation. The radiation shield 49 has been provided to eliminate this. As stated hereinbefore, the shield 49 is a metallic tube of good thermal conductivity, formed with the terminal fitting 29. Either the terminal 18 or the terminal 29 may have the shield 49 attached thereto. The shield 49 is preferably of copper, or other metal of high thermal conductivity, and it receives the direct radiation from the wire 3 and dissipates the heat, by conduction, to the adjacent parts, and by radiation over a larger area than that which would be effected by the wire 3 alone. The peak temperatures of the wire 3 are always attained at the midpoint of the fusible section, hence the small gap at the end of the radiation shield 49 does not materially alter or reduce the effectiveness of it. The dimensions of the tube 38, the shield 49, and the alignment of the parts, is such that the shield cannot come into contact with the fiber tube, and sufficient room is provided for the free expulsion of the shield 49 and its connected parts upon blowing of the fuse wire 3.

The fusible wire 3 is preferably formed of a nickel-chromium alloy, secured upon the market under the trade name of "Chromel A." Tests show that this nickel-chromium wire retains considerable mechanical strength at elevated temperatures (even at red heat), but that a rather abrupt weakening occurs at temperatures which have been computed to be about 800° to 900° C. The melting point of these wires is approximately 1400° C. The effect of these properties of the nickel-chromium wire is to produce a certain relationship between the current flowing and the mechanical tension, which has been utilized to render these links practically independent of external mechanical forces, within certain limits. I have made tests to determine the effect of spring tension upon the time-current characteristic of a link. These tests show that a direct relationship exists. For example, the current required to blow a fuse wire of a diameter of .0204 inch in 100 seconds (this approximates the minimum fusing current for the particular terminal arrangement employed during these tests), amounted to 12.5 amperes, when no tension is applied. The current, however, decreases rapidly with increased spring tension up to about 4 pounds, which means that rupture occurs at temperatures below the melting point progressively approaching the critical range of from 800° to 900° C., as the tension approaches 4 lbs. for this particular size of wire, corresponding to a current of approximately 7 amperes. Any further increase in tension results in a gradual but slight decrease in the blowing current until the ultimate strength of the wire is reached, whereupon the blowing current abruptly drops to zero. That is to say, there is a purely mechanical failure. If the link assembly contains no provision to apply a mechanical load, it is apparent that any particular link would have a time-current characteristic which would vary with the mechanical loading. Since the time of operation of the fuse wire depends upon the applied tension, it will be clear that the tension applied thereto should always be maintained at the same value in order to get consistent operation. For this purpose I have provided for prestressing the fusible element 3.

The relationship between the time required to cause a fuse wire to blow and the current for different tensions applied to it, is illustrated graphically in Figure 28 of the drawings. As there shown, with no tension $P_0$ applied to the wire, the current $I_0$ required for blowing the wire is greater than the current, for example, $I_1$ or $I_2$, required to blow the fuse wire to which a tension $P_1$ or $P_2$, respectively, is applied. Thus, for a given fuse wire, the ratio between blowing currents may be of the order of 1:2, depending upon whether the fuse wire is stressed or not.

The curves shown in Figure 27 illustrate the relationship between the tension applied to fuse links or wires of several different current ratings and the current required to blow them in 100 seconds. With no tension applied to the link or wire the blowing current is approximately twice that required when a tension $P_1$, equal, for example, to about 4 lbs., is applied, which brings the blowing currents below and to the right of the knees of the various curves. It will be observed that the curves are substantially parallel with the $x$-axis for a considerable part thereof, indicating that in the flat portion of any one of the curves the fusing current for a given time will be substantially the same, regardless of the tension applied greater than the minimum tension required to enter the region to the right of the knee of the curve. If the tension $P_2$ which is applied externally in mounting the fuse link is of the order of 10 to 12 lbs., the current $I_2$ required to fuse the 10 ampere link will be substantially the same as the current $I_1$ required to fuse it if an external tension no greater than $P_1$, for example, 4 lbs. as assumed, were applied. It will thus be apparent that a fuse link which is prestressed to the required tension will always blow according to its current-time rating although it may be subjected to widely varying tension conditions, due to different types and manners of mounting it for operation in a fuse receptacle or otherwise.

It will be observed that the tension at which even the lowest rated fuse link will break or fail mechanically is considerably beyond the tension $P_2$ to which it will ordinarily be subjected. Thus for even the smallest size of fuse link, what may be termed a "handling strength" of about 20 lbs. is available. Such a relationship would not exist and the blowing current would not be so constant over the wide tension range if the link were not prestressed to bring it into this operating region.

In order to demonstrate the manner in which the fusible element is prestressed, reference may be had particularly to Figure 3 of the drawings. In Figure 3 it will be observed that the fuse link 1 has applied thereto an external force derived, for example, from the cut-out spring 50, as in the well known Schweitzer & Conrad cutouts, but the construction of the fuse link 1 is such that the stress applied by the spring 50 does not add cumulatively to the seven pound tension of the spring 33 embodied in the fuse link itself. This will be apparent when the detailed construction of these fuses is considered. Any tension upon the flexible lead wire 4 in excess of the tension of the spring 33 will shift the abutting portion 37 from the cap or plate 36 to take the reaction of the spring 33 off of the fiber tube 38 and to place it against the end of the collar 35 which is attached fixedly to the lead 4. Thereupon the spring 33 is further extended or expanded to take up the slack in that portion 40 of the flexible lead 4 which lies between the collar 35 and the socket 32, and thereupon add to the tension upon the fuse wire 3 the difference between the tension of the spring 33 and that added by the mounting. That is to say, assume that the pull upon the flexible lead 4 produced by the spring 50 in Figure 3 is 12 lbs., and that the initial stressing of the spring 33 is 7 lbs. The tension upon the wire 3 is not the sum of 7 and 12 lbs., but is merely 12 lbs., since the spring 33 and the section 40 of the lead 4 are mechanically connected in parallel. The load is thereby divided, so that approximately 8 lbs. is transmitted through the spring 33 and 4 lbs. through the cable section 40. This relieves the joint between the socket 32 and the pinched end of the cable 40 from the full mechanical load. The great virtue of this construction resides in the fact that the minimum loading of the fuse link is fixed by the spring 33 and the loading produced by the mounting does not add thereto unless it is greater than the initial spring tension of the spring 33. Moreover, because of the provision of the spring 33, the link assembly is capable of more readily interrupting low current arcs than has been possible with the constructions of the prior art. By means of the foregoing described construction, a series of low current links, of ratings from 1 to 10 amperes, may be provided in which, by proper coordination of the minimum and the maximum values of tension to be imposed on the fusible section, and the mechanical properties of said section as related to its fusing characteristics, the desired results may be obtained. These fuses embody time-current characteristics which are essentially the same, regardless of the type of cut-out or mounting in which they are applied.

Figure 5:
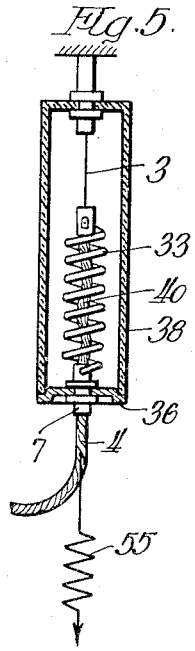
Figure 6:
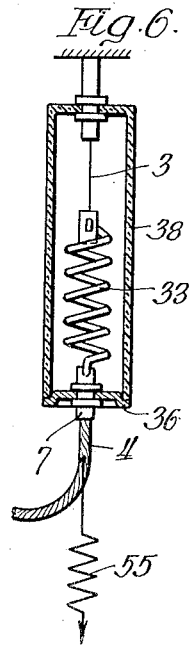

For a further description of the character of the predetermined spring tension, reference may now be had to Figure 4 of the drawings, wherein a spring 53 is shown as anchored at 54 upon the end of the fiber tube 38, the additional spring loading of the mounting being indicated at 55. Here, if it be assumed that the spring 53 imposes a minimum tension of, for example, 7 lbs., any tension or load which is imposed by the mounting through the spring, as indicated at 55, produces an additive effect. That is to say, whenever the tension of the mounting is applied as to the spring 55, it will be added to the tension of the spring 53, and thereby there will be a tendency to alter the time-current characteristics of the fusible link 3, depending upon the mounting in which the link is placed. By comparison with the construction shown in Figure 5 of the drawings, it will be seen that the additional load 55 of the mounting tends merely to take up the reaction of the spring 33 upon the end of the fiber tube 38, and unless the load as indicated at 55 is in excess of the reaction of the spring 33, no additional tension will be imposed upon the link 3. As shown in Figure 6 of the drawings, the spring 33 alone may serve as the connection between the flexible lead 4 and the terminal of the fusible link 3. That is to say, the shunt portion 40 is not essential where the spring has sufficient conductivity.

Figure 7:
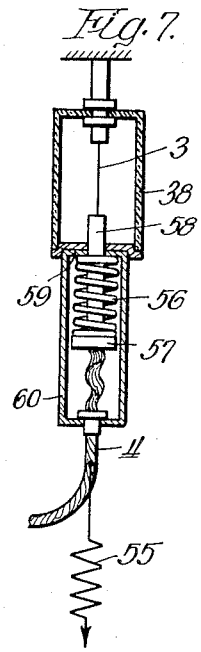

The spring which applies a predetermined tension to the link 3 need not be a tension spring, but may be in compression, as shown in Figure 7 of the drawings. The compression spring 56 is here disposed between a head 57 on the movable terminal 58 and a flange 59 of the yoke or tube 60, to which the flexible lead 4 is connected. A feature of the constructions indicated in Figures 6 and 7, as compared with that of Figure 5, is to be noted in that when no shackle or limit to the motion of the spring 33 or 56 is provided, the more stressed spring 55 and the less stressed spring 33 or 56 will strike a balance of displacement when the tension of the link 3 will be something less than that of the spring 55 and something more than that of the spring 33 or 56. This is all within the concept of non-cumulative loading. When a compression spring is employed, the contacting of the convolutions may serve as a limit or shackle.

In order to adapt fuse links of my invention for mounting in various devices such as are now employed, I have provided the fittings or accessories illustrated in Figures 8 to 12, inclusive.

Figure 10:
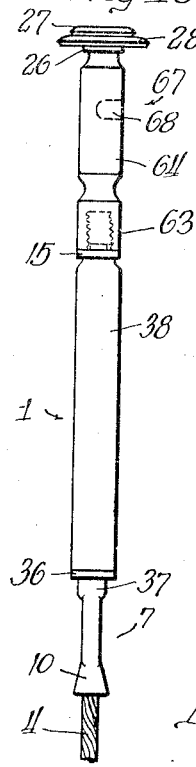
Figures 8, 9, 10, 11 and 12 are views showing different types of fuse link adapters.
Figure 11:
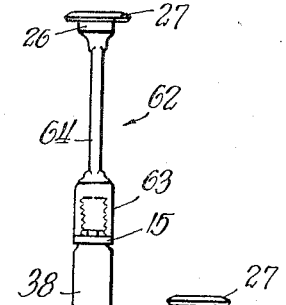
Figures 8, 9:
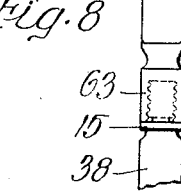

In Figures 8, 9, and 11, a fitting 62 is illustrated, preferably made of a drawn tubular piece of metal such as a copper tube, having a threaded portion 63 at the lower end for cooperating with the threaded stud 14 of the fuse shown in Figure 2. The upper end of the fitting is expanded or spun out to form a conical head 27 substantially identical with the head 27 shown in Figure 2. An intermediate flattened portion 64 is formed by pinching the walls of the tube together. A tongue 65 is sheared out of the upper end of the flattened metal portion 64, so that the head 27 may be broken off and the tongue 65 removed, to leave a notch 66, as shown in Figure 9, when a mounting around a bolt or pin is required for connecting the link at its upper end to a corresponding terminal. A conical washer 28, as shown in Figures 2 and 10, may be employed, where the head is retained for mounting upon an annular seat, as will be described hereinafter.

Figure 12:
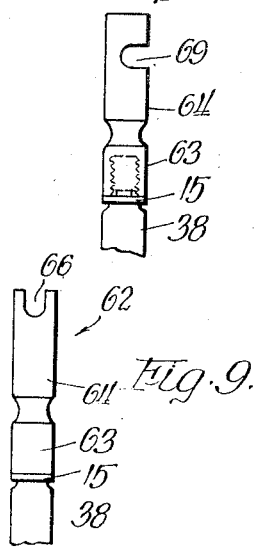

The terminal 67 shown in Figures 10 and 12 is similar to that shown in Figure 8, except that in this instance a tongue such as 68 is struck laterally in the flattened portion 64, so that when the head is broken off and the tongue broken out, the terminal appears as shown in Figure 12, with the notch 69 in the side edge of the flattened portion 64. This adapts the terminal for connection in certain binding post arrangements in mountings now in use. The use of partially sheared portions, which might be termed knockouts, permits the utilization of the metal for electrical and heat conductivity, with ready removability. Both knock-outs may be embodied in the same terminal portion 64.

In Figures 13, 14 and 15, I have shown a form of mounting in which the device of Figure 1 is adapted to be employed as a complete operative fuse device in connecting a house drop conductor to a line or distribution conductor. This device comprises a connector 74 adapted to make connection with a continuous conductor such as 75, as shown in Figures 14 and 15. The secondary distribution conductors 75, 76 and 77, shown in Figure 15, are supported upon a secondary rack 78, providing suitable insulators for each conductor, the rack being mounted upon a pole 79 or the like. The drop 80 comprises, in this case, a pair of concentric conductors having leads 82 and 83 which are adapted to be connected to the secondary distribution conductors 75 and 77. The concentric pair forming the drop 80 includes a supporting strand, which may be a suitable wire cable 84, anchored upon the pole 79 through an insulating eye 85 having a threaded shank screwed into the pole.

The connector 74 comprises a U-shaped body, the base 86 of which is hexagonal in form and the parallel arms of which are threaded as indicated at 87 to receive a clamping nut 88. A transverse bar 89, having a shank 90 extending inside of the nut 88, is of a width to substantially fill the slot 92, so that when the nut 88 is screwed down to clamp the bar 89 upon the conductor 75, the arm 87 will not be able to escape from the nut 88. The shank 90 has the edges thereof riveted over the top edge of the nut 88, so that the bar 89 and nut 88 will remain together, even when they are removed from the fitting 74 to admit the continuous secondary conductor 75. The conductor is preferably insulated, but it has the insulation removed in order to accommodate the clamp 74. The clamp 74 has a threaded opening axially through the bottom hexagonal portion 86 to receive the shank 14 of the upper terminal 13 of the link shown in Figures 1 and 2 of the drawings. The flange 15 is screwed up tightly against the bottom face of the hexagonal portion 86 to make good electrical connection and to support the link with the fiber tube 38 in horizontal position.

The flexible lead 4 is connected to the corresponding conductor of the drop 80, as shown in Figure 15. Within the fiber tube 38 is disposed spring 33 and in the event of overload in the circuit including the conductors 82 and 83, the fusible link operates and the lower terminal, to which the spring 33 is attached, retracts the movable terminal such as 29. The spring recoil, with the addition of the gases freed or formed upon blowing of the fuse, expels the terminal 29 from the tube and throws the wire 82, for example, with the connected link 4, to the right as viewed in Figure 15, into the clear. The conductors 82 and 83 may be so disposed and formed as to facilitate this action. From this style of mounting it can be seen that the fuse link is a complete fuse device within itself having its own fiber expulsion tube and spring loaded fusible element, capable of maintaining its predetermined characteristics quite independently of any aid from an additional fuse tube or the mounting in which it may be disposed.

The general purpose to which this form of fuse link may be applied is illustrated in Figures 16 to 21 of the drawings, inclusive, as well as in Figure 3, as has previously been mentioned. The device shown in Figure 3 comprises a standard device on the market, manufactured by my assignee, and is designated as the S & C ejector cutout (see Patent No. 1,818,382). It comprises a tubular porcelain or like insulating housing 93 within which are mounted annular terminals (not shown) for making connection with the corresponding annular terminals on the fuse tube 94. The lower ferrule on the fuse tube 94 carries an arm 96 with a conical wedge-like socket 12 to receive the conical wedge-like member 10 shown in Figure 1 of the drawings, the lead 4 below the member 10 being cut off when the device is installed. The upper end of the unit 1 has the threaded stud 14 threaded into a threaded socket 97 which, in turn, is connected to the spring 50. Upon operation of the device under excessive current flow the spring 50 pulls the upper terminal 13, with the connected fiber tube 38, upwardly, and the spring 33 throws the lower terminal fitting 29 downwardly. At the same time, the gases of the arc tend to assist in expulsion of the lower terminal, the spring 33, the flexible lead portion 40, and the plate 36.

Figure 16:
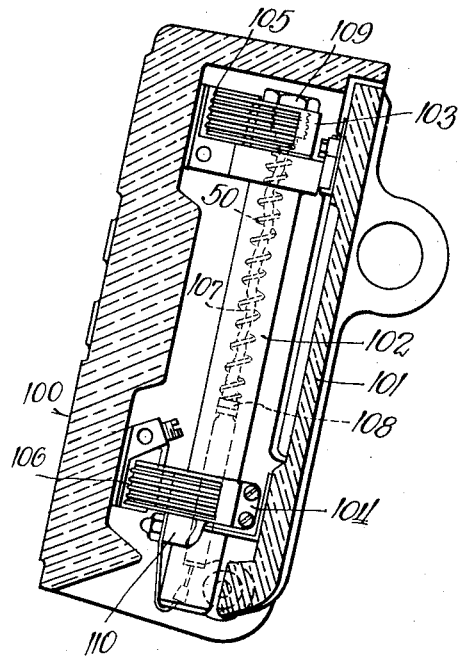

In Figure 16 I have shown the link of my invention as employed in a cutout box 100 having a lid 101. The fuse tube 102 carried upon the lid member and the ferrules 103 and 104, are provided with projecting contact springs formed of pairs of wires for engaging stationary flat studs 105 and 106 mounted on the bottom of the box member 100. The fuse tube 102 employs a retractile spring, such as that indicated at 50 in Figure 3 of the drawings, with a flexible lead 107 connecting the threaded socket 108 and the threaded plug 109 which closes the upper end of the ferrule 103. The threaded socket 108 receives the threaded stud of the upper terminal member 13 and the flexible lead 4 is brought out of the lower open end of the tube and brought back to a clamp terminal 110 connected with the lower ferrule 104. In this construction the spring 50 applies the main spring tension which, as in the mounting shown in Figure 3, may be in excess of that of the spring 33 of the element or link 1. The tension of the main retractile spring 50, working through link 1, is sustained on the lower open end of the tube where the flexible lead 4 passes over the edge or lip of the same.

Figure 17:
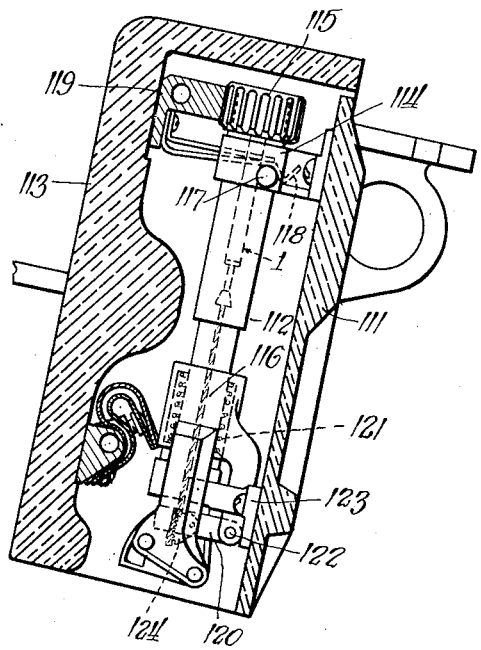

In Figure 17 I have shown a dropout box somewhat different from that shown in Figure 16. In this device the lid 111, which carries the fuse tube 112, is held in closed position on the box 113 by the integrity of the link 1 in the fuse tube 112. The fuse tube 112 has an upper ferrule 114 with a threaded cap 115 for clamping upon an annular seat the button heads such as shown in Figures 1 and 2 of the drawings to make connection with the upper terminal. The ferrule 114 is fastened to the door 111. The fuse tube 112 is mounted in a fitting 116 with respect to which the fuse tube may have a sliding motion under the influence of the spring 121 to move the fuse tube downwardly to disengage the pin 117 from the latch spring 118 which connects with the upper stationary terminal 119. The lower end of the fuse tube bears upon a pivoted link 120 pivoted at 122 to the fitting 116. The lower end of the fuse tube 112 is mounted in a stationary bracket 123 mounted upon the door 111. A cam-shaped clutch jaw 124 grips the lower end of the flexible lead 4 against the corresponding jaw on the link 120. The tendency of the spring in compression is to stress the fuse tube 112 down against the link 120 and this reaction is taken up by the tension in the flexible lead 4 and thence in the entire link. Upon melting of the fusible element the fuse tube 112 drops down, as the link 120 is no longer sustained by tension of the link 1, the pin 117 is unlatched from the spring latch 118, and the door 111 drops open.

Figure 18:
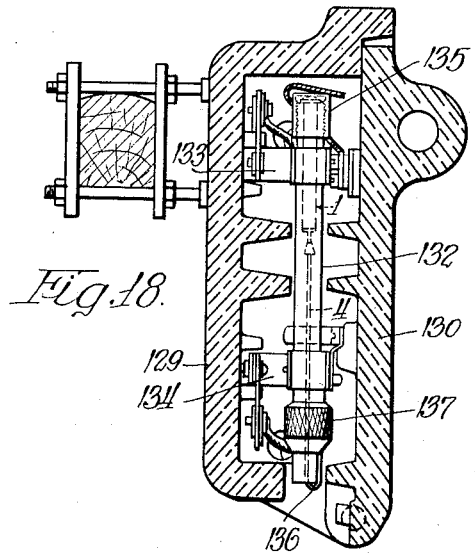

A link of my invention is interchangeably applicable to the fuse tube and mounting shown in Figure 18. This construction comprises a box 129 having a hinged cover 130, the cover being adapted to carry the fuse tube 132 cooperating with the spring terminals 133 and 134 mounted within the box. The fuse tube 132 has an upper ferrule with a threaded cap member 135 and an annular seat for clamping the button heads such as shown in Figures 1 and 2 of the drawings to make connection with the upper ferrule. At the lower end the flexible lead 4 is led out through the lower end of the open tube, as indicated at 136, and the end of the lead is brought under the annular knurled nut 137 and there clamped to the surface of the lower ferrule. In this mounting there is no additional spring tension to that which is imposed by the spring 33 within the inner fiber tube 38 of the link. The operation of the device is substantially the same as heretofore described, that is to say, the predetermined tension of the spring 33 acting upon the fusible element causes the same to be parted when the proper current value is reached, the resultant parting assisting in expelling the flexible lead and the lower terminal and connected parts.

Obviously, in any of these mountings, if the current flow is so heavy as to result in a violent blowing of the fuse, the inner tube or sleeve, which is the sleeve 38 of the link, may be shattered, but even in such operation the inner surface of the main or outer sleeve or tube 102, 112 or 132 is protected in large measure. The outer sleeve is usually made of fiber which, when the arc is heavy, evolves a beneficial gas and also cleans itself.

Figure 19:
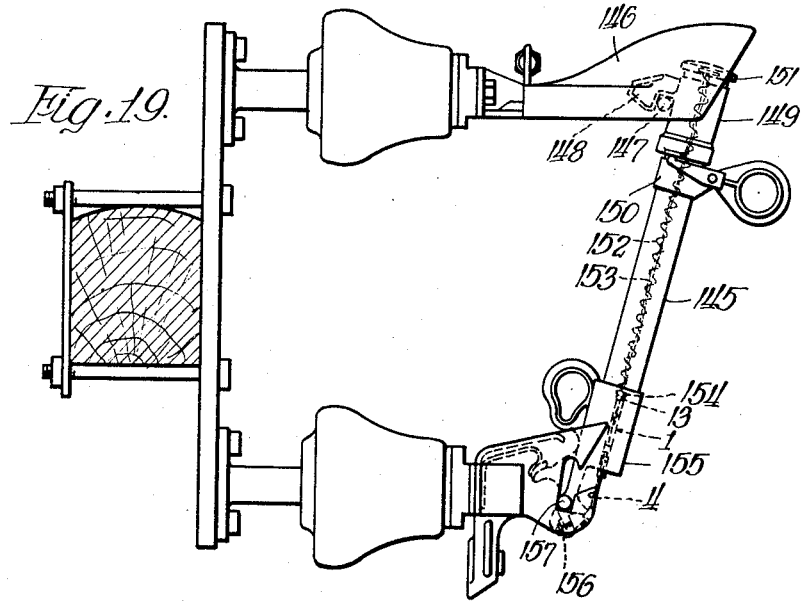

In Figure 19 I have indicated a mounting of the fuse tube 145 to secure a dropout effect of the said fuse tube 145 from the mounting. This mounting comprises an upper stationary bracket 146 comprising a hood containing suitable contacts and including a spring mounted pin 147 which is adapted to be engaged by the hook 148 formed on the movable sleeve 149 of the upper ferrule 150. A compression spring between the sleeve 149 and the stationary ferrule member 150 and housed in sleeve 149 tends to throw the sleeve 149 and hook 148 upwardly. The sleeve 149 has a threaded cap 151 for clamping the button head of a suitable spring mounting. A tension spring 152, shunted by a suitable flexible conductor 153, carries at its lower end a threaded coupling 154, and the stud 13 of Figure 2 is threaded into said fitting 154, whereby the upper portion of the link 1 is mounted within the lower end of the fuse tube 145. The flexible lead 4 is carried down to the lower end of the extension on the ferrule 155 and connected under a binding post 156. When the fusible link melts or yields, the spring 152 pulls the stud and tube 38 upwardly, releasing the sleeve 149 and permitting the hook 148 to travel upwardly and detach itself from the pin 147. Thereupon the force of the spring contacts which bear upon the sleeve 149, and the force of gravity, throw the fuse sleeve 145 in a clockwise direction about the trunnion 157, taking the fuse tube 145 out of the circuit.

Figure 20:
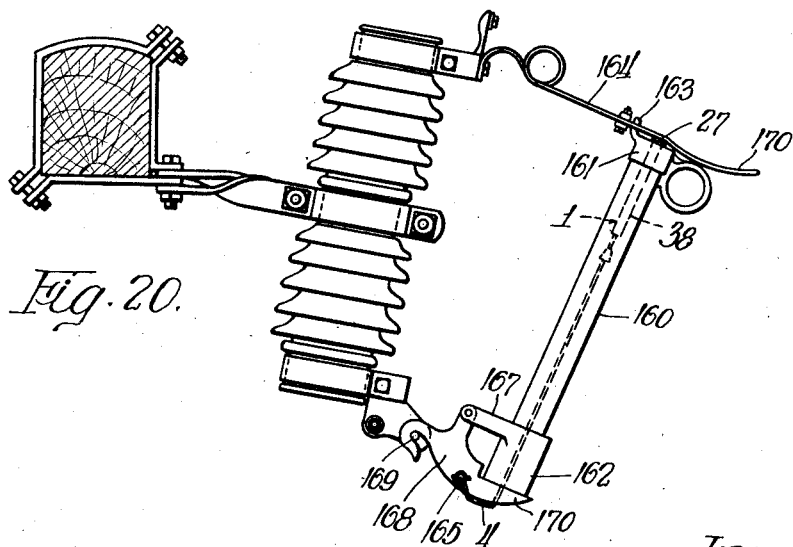

Another form of fuse mounting is shown in Figure 20 of the drawings. The fuse tube 160 in this structure has an upper ferrule 161 and a lower ferrule 162. The upper ferrule 161 has an opening through the same permitting the sleeve 38 of my link 1 to be passed therethrough, allowing the button head 27 to project. A finger 163 projects upwardly from the upper ferrule 161 and is designed to pass through a pair of spring rods 164 forming the upper terminal. These spring rods press downwardly, both to make contact with the button head 27 and to throw the fuse tube 160 into open position when the fuse element of my link melts. The lower ferrule 162 has an arm 167 pivoted to a bell crank lever 168, one end of the lever being held against the lower end of the fuse tube 160 by the flexible lead 4, which is fastened under the binding post 165. The bell crank lever 168 has a hook about the trunnion 169, which trunnion is mounted on the lower stationary terminal of the mounting. The downward thrust of the spring rod 164 is sustained by the link 1, which holds the arm 170 of the bell crank lever 168 against the lower end of the fuse tube 160. When the link 1 is ruptured by melting of the fusible element the downward thrust of the spring rod 164 and the weight of the fuse tube 160 tend to cause a rotation of the bell crank lever 168 in a clockwise direction about the trunnion 169. This action pulls the flexible lead 4 outwardly in the tube 160. At the same time the fuse tube 160 descends and, as the button head escapes from under the hump 170 in the spring rod 164, the fuse tube 160 drops out of the circuit.

Still another type of fuse mounting is shown in Figure 21 of the drawings. In this figure I have shown the link of my invention employed in a mounting having a fuse tube 171, the upper ferrule of which has a knurled cap 172 and an annular seat for receiving the button head such as is shown in Figures 1 and 2 of the drawings. The flexible lead 4, in this instance, is attached by a clasp 173 attached to a leaf spring 174 anchored at 175 to the lower ferrule 176. Upon melting of the fuse the leaf spring 174 flips the lead wire 4 and connected lower terminal out of the lower end of the fuse tube 171. In this construction the leaf spring 174 supplies spring tension for any link which is mounted in the device. The link of my invention is interchangeable with the original fuse link supplied in connection with the mounting shown in Figure 21. In this construction the spring brackets for mounting the fuse tube are supported upon an insulating member 177 which, in turn, is adjustably mounted upon a cross arm 178 by a suitable metallic pin clamp and bracket.

From the foregoing illustrations it will be observed that the fuse link of my invention is interchangeable and applicable in a wide variety of mountings which now employ fuse links constructed in accordance with the teachings of the prior art. The fuse link of my invention, having predetermined spring tension independently of the mounting, and being so arranged that the spring load or gravity load of the mounting is exerted against the reaction of the spring 33, will maintain a time-current characteristic of a predetermined nature with utmost fidelity, independently of the particular mounting in which it is employed. The above illustrated mountings are but typical examples of mountings in which the fuse of my invention may be used.

From the foregoing it will also be apparent that I have provided a fuse link suitable for employment in a wide variety of mountings, and in which there is a predetermined spring tension to control the time-current relationship of the fusible element according to a desired mode of operation. This predetermined spring tension also assists in parting the nickel-chromium or the like wire when the current value is such as to cause the wire to lose its mechanical strength. By coordinating the spring tension with the cross section of the wire, a very definite time-current relationship and response is obtainable.

Insofar as I am aware, it is broadly new to employ the radiation shield 49 to protect the internal surface of the surrounding tube or the main fuse tube from injury by radiation of heat from the fuse wire, particularly when this fuse wire operates at a fairly high temperature for a considerable period of time before it fuses. Moreover, a fuse constructed in accordance with my invention employs the feature of non-additive spring tension or loading in the mounting. That is to say, the load which is imposed upon the link of my invention by conventional mountings does not necessarily increase the tension upon the fusible element, because the loading of the mounting is applied in first overcoming the reaction of the spring 33 before further tension is applied to the fusible element.

Still another novel feature of my invention as described hereinbefore is the provision of various types of attachments and fittings for making the fuse applicable to a wide variety of mountings. A particularly important feature is the employment of the threaded stud with interchangeable terminal parts, whereby the link may be applied to a wide variety of terminal fittings. With such arrangement the heat generated in the fusible member may be more readily dissipated.

The tube 38 is preferably of fiber which evolves gases by destructive distillation produced by the heat of the arc, which gases are beneficial in extinguishing the arc. The tube may be treated with or lined with material which promotes the gas evolution.

The invention is not to be limited to the use of a high tensile strength wire for the fusible element, as the spring tension will assist the parting of any fuse conductor when subjected to mechanical stress and heat. The non-cumulative loading may be employed where a silver conductor 3a and a strain wire 3, as shown in Figure 26, form the fusible element for certain advantages—such as non-accumulative tensioning of the strain wire, which preserves the margin of safety against mechanical breakage, rapid separation of the terminals and the like, but the beneficial effect upon the time-current characteristic in such cases would be slight since the blowing time of the strain wire after the fusing of the main fusible element is usually negligible.

It will be observed that the link of my invention is a complete fuse device within itself, and may be so employed, as shown, for example, in Figure 15 of the drawings. In this form it is suitable for lower voltages, such as 110 or 220 volts. Obviously, by changing the proportion of parts the voltages may be higher, depending upon the service which is required. It will be noted that the fuse shown in Figure 15 of the drawings may omit the spring where the fuse rating is great enough to provide the expulsive functioning.

The surge protecting feature and radiation shield of my invention are applicable to fuses generally. In Figures 22 to 25 I have illustrated its employment in a liquid filled fuse of the type illustrated in Figures 1 to 4 of Patent No. 1,743,322. This type of fuse is for small ampere capacity, but applicable to any desired voltage. The fuse illustrated in Figure 22 comprises a glass sleeve 190 carrying a ferrule 192 at the lower end and forming a closure. At its upper end there is mounted a ferrule 193 which is provided with an open top normally closed by a vent cap 194 suitably cemented or otherwise secured over the opening and adapted to be released by internal pressure generated within the closed fuse housing when the fusible element is blown. The ferrule 193 has a cylindrical bore 195 at its upper end terminating in a shoulder 196. Within the bore 195 is disposed an S-shaped terminal member 197 made of flat spring stock, the cylindrical portions of which bear against the bore 195 and the edge portions of which bear against the shoulder 196. The transverse central portion 198 forms a diametrical bridge to which is attached the flattened portion 199 of the upper fuse terminal member 200. The upper fuse terminal member as shown in Figures 23 and 24 comprises a piece of tubing of copper or other good conducting metal in the upper part of which there is disposed the eye 202 of the fusible wire 203. The upper end of the tube is flattened to produce the flat terminal portion 199 and also to grip the said eye 202 of the fusible element. The fusible element is preferably a length of nickel chromium wire with the ends formed into the upper eye 202 and the lower eye 204 by bending the end into a loop and welding of the end to the shank of the wire. The unflattened portion of the tube 205 embraces loosely the main body portion of the wire 203 and lies out of contact with the same. A hole 206 is preferably formed in said unflattened or shield portion 205 to facilitate the drainage of liquid from the tube, which it may enter during shipment or handling prior to installation in the vertical position. This is important, since the time-current characteristics would be changed by the presence of a liquid cooling medium in direct contact with the wire.

The flattened terminal portion 199 is provided with a hole 207 for riveting said terminal portion 199 as by the rivet 208 to the bridge portion 198 of the terminal member 197.

The upper end of the flattened portion is provided with a hole 299 by which the spring 210 may be tensioned in the assembly of the fuse. Said extending upper end may be cut off or bent over after the rivet 208 is in place.

The lower terminal for the fusible element comprises a tube of copper or other metal of suitable conductivity flattened upon the lower eye 204. This lower terminal 212 comprises an anchoring portion 213 at its lower end having the screw hole 214 and cross notch 215 for the attachment of the spring anchor at the upper end of spring 210.

Intermediate the portions 212 and 213 I provide means for supporting the liquid director 216. The liquid director 216 has a cylindrical groove 217 formed on its inner periphery. A thin strip of spring metal shown in extended form at 218 in Figure 23 is passed through the tube of which the lower terminal 212 is composed before the same is flattened. The ends of the strip 218 are then bent into an S-shape similar to the terminal 197 as indicated at 218' on Figure 24, and the spring arms expand into the groove 217 of the liquid director 16 and hold the liquid director 216 firmly to the terminal member 212. As will be apparent from the drawings, a small gap exists between the lower end of the shield portion 205 and the upper end of the terminal member 212 providing thereby a surge or spark gap across which high potential surges or similar disturbances tend readily to pass without causing blowing of the fuse wire 203.

The fuse housing is filled with liquid to substantially the level of the top of the liquid director 216 at normal room temperatures. An arcing chamber 219 formed of a short tube of fiber or of suitable insulating material of fibrous character, which may be impregnated with a synthetic resin, is disposed loosely about the fuse assembly. This tube 219 rests at its lower end on or substantially on the liquid director 216 and at its upper end is slotted to grip opposite sides of the bridge member 198, as will be apparent from Figures 22 and 25.

This tube confines the products of arcing when the fuse initially blows, and tends to cause the discharge of the metallic vapors and other gaseous products endwise towards the open end of the ferrule 193. The cap 194 is readily removed by blowing of any appreciable violence, and the products of the arc are thereby expelled in an orderly manner. Also, since the present fuse is of relatively small bore the arcing chamber formed by the shell 219 tends to save the upper end of the glass tube from the heat of the initial arc, particularly before the arc extinguishing liquid is projected into the space occupied by the arc.

In operation of the device the current normally flows between the lower terminal 212 and the upper terminal portion 200. Any heat which is radiated from the fusible section tends to be distributed by the shield portion 205 and is radiated and conducted therefrom to adjacent conducting parts. The shell 219 tends to screen the upper end of the glass tube from direct radiation of heat.

In the event of a steep wave front disturbance of the type termed a surge arising on the circuit including the use in Figure 22 the tendency of the same is not to follow the fusible wire 203 but to spill across the gap before the wire 203 has been fused.

Upon a relatively low overload the wire 203 is parted by the spring tension and weakening of the wire and an arc is formed with resultant motion downwardly of the terminal 212 and liquid director 216, whereby liquid is projected into the arc space and if the pressure rises to the predetermined value for which the cap 194 is designed to be released the gases and vapors will be expelled out of the open end.

On more violent blowing the vaporization of the fuse wire and the evolution of gases by the arc may produce pressures violent enough to expel the upper terminal 197 and connected member 200. The resulting flow of arc extinguishing liquid into the arc space and deionization of the arc results in extinction of the same. This structure obviously is capable of modification and variation within the above teaching.

Since certain further modifications may be made in the foregoing constructions, and different embodiments of the invention may be made without departing from the scope thereof, it is intended that all matters set forth in the foregoing description and shown in the accompanying drawings shall be interpreted as illustrative, and not in a limiting sense.

I claim as my invention:

1. In combination, a stud member having a threaded end, an intermediate portion, and a tubular portion on its opposite end, a fusible element one end of which is disposed in said tubular portion, which tubular portion is compressed upon said one end, a flexible lead, a tubular coupling member having one end compressed upon said flexible lead and the other end compressed upon the other end of the fusible element, a tube of insulation surrounding said element, one end of the tube engaging said intermediate portion, and a spring for tensioning the fusible element interconnecting said coupling member and said tube, the reaction of said spring being taken up on said tube as a compression member.

2. In combination, a terminal member comprising a threaded stud, an intermediate portion and a fuse coupling portion, a fusible element engaged by said coupling portion, a flexible lead, a junction member joining the end of the lead and the fusible element, an insulating sleeve secured to said intermediate portion and surrounding said element, an anchor member engaging said sleeve, a spring anchored to said junction member and to said flexible lead, and means connecting said flexible lead to said anchor member.

3. In combination, a fusible element, a first terminal for said element having coupling means, a second terminal for said element, a tube of insulation resting against and being closed by said first terminal, anchor means engaging the tube, a spring connecting said second terminal and said anchor means to place the tube in compression and the element under tension, and an external lead connected to said spring anchor.

4. In combination, a fusible element, a first terminal for said element, a second terminal for said element, a tube of insulation fixed at one end to said first terminal, anchor means engaging the free end of the tube, a spring connecting the anchor means and the second terminal to place the tube under compression and the element under tension, and a conductor anchored to said anchor means, whereby tension on the conductor is ineffective to increase the tension on the element unless it is great enough to overcome the stress of the spring.

5. In combination, a fusible element, a first terminal for said element, a second terminal for said element, a tube of insulation fixed at one end to said first terminal, anchor means engaging the free end of the tube, a spring connecting the anchor means and the second terminal to place the tube under compression and the element under tension, and a conductor anchored to said anchor means whereby tension on the conductor is ineffective to increase the tension on the element unless it is great enough to overcome the stress of the spring, a portion of said conductor forming an electrical shunt of said spring.

6. In combination, a fusible element, a first terminal for said element, a second terminal for said element, a tube of insulation having said first terminal mounted at one end, said tube extending over said element and said second terminal, a spring anchor plate engaging the free end of the tube, a flexible lead extending through said plate and joining said second terminal, a spring within the tube connecting spaced parts of the flexible lead, and means on the lead bearing against the outside of the spring anchor plate to transmit the tension of the spring to said plate.

7. In combination, a fusible element, a first terminal for said element, a second terminal for said element, a tube of insulation having said first terminal mounted at one end, said tube extending over said element and said second terminal, a spring anchor plate engaging the free end of the tube, a flexible lead extending through said plate and joining said second terminal, a spring within the tube connecting spaced parts of the flexible lead, and means on the lead bearing against the outside of the spring anchor plate to transmit the tension of the spring to said plate, said means comprising a tubular member compressed upon the lead and having a flared wedge portion for wedging engagement with a stationary cooperating contact.

8. As an article of manufacture, a self-contained fuse link, comprising a continuous conductor having terminal portions, a fusible element intermediate said terminal portions, means for tensioning said fusible element comprising a spring connected at one end to the first end of the element and connected at its other end to an intermediate part of said conductor, and means for taking up the reaction of the spring, comprising a strut connected at one end to the other end of the element and at its other end to said intermediate part of the conductor.

9. As an article of manufacture, a self-contained fuse link comprising a continuous composite conductor adapted to be mounted in an expulsion tube, said link having a mounting terminal at the first end thereof and having a flexible lead for expulsion from the expulsion tube ending in a second terminal for the link at the second end thereof, said link having a fusible portion, the first end of said portion being connected to said first terminal, the flexible lead being connected to the second end of said fusible portion, and means for holding the fuse link under tension independently of the attachment or nonattachment of said terminals.

10. The combination of claim 9 wherein said means comprises a coil spring exerting a tension stress on the fusible portion, and a tube surrounding the fusible portion and taking upon one end thereof the reaction of said spring, whereby a pull exerted on the flexible lead will oppose the reaction of the spring upon the tube.

11. A terminal for a fuse or the like, comprising a head, a shank, said shank having a portion thereof partially severed transversely but mechanically and electrically in contact with the remainder whereby it serves as an electrical and heat conducting portion but may be removed to provide an opening to facilitate clamping by a binding post.

12. A fuse link comprising a fusible element, an insulating tube surrounding said fusible element, a first terminal member for the element, a second terminal member for the element, said members having portions to connect thereto the ends of the element, a flexible lead connected to the second member, a metal radiation and corona shield forming an extension of one of said members and covering substantially the full free length of said element and spaced therefrom with an air dielectric therebetween.

13. A fuse link comprising a fuse element, a first terminal member for the element, a second terminal member for the element, said members having socket portions pinched upon the ends of the element, a flexible lead connected to the second member, a metal radiation and corona shield forming an extension of one of said members and covering substantially the full free length of said element, and a tubular insulating sleeve supported coaxially with said shield but out of contact with the same.

14. A fuse link comprising a fuse element, a stud forming a first fuse terminal for said element, a tube of insulation having one end bound upon said stud in axial alignment, said element being anchored in the end of the stud inside the tube, a second fuse terminal for said element disposed in said tube and secured to the end of said element, said latter terminal having a tubular radiation and corona shield extending loosely about but out of contact with the element over substantially its full length, and a flexible lead for said second terminal.

15. A fuse link comprising a fuse element, a stud forming a first fuse terminal for said element, a tube of insulation having one end bound upon said stud in axial alignment, said element being anchored in the end of the stud inside the tube, a second fuse terminal for said element disposed in said tube and secured to the end of said element, said latter terminal having a tubular radiation and corona shield extending loosely about but out of contact with the element over substantially its full length, a flexible lead for said second terminal, and a spring bearing against the end of the tube and tensioning the element.

16. In a fuse, a fitting comprising a terminal and radiation shield member consisting of a tubular portion adapted to embrace loosely a fuse wire, an intermidate tubular portion of smaller diameter adapted to be pinched upon the end of a fuse wire, and a socket adapted to receive the end of a flexible copper lead and to be pinched thereupon.

17. In a fuse, a fitting comprising a terminal and radiation shield member consisting of a tubular portion adapted to embrace loosely a fuse wire, an intermediate tubular portion of smaller diameter adapted to be pinched upon the end of a fuse wire, and a socket adapted to receive the end of a flexible copper lead and to be pinched thereupon, said intermediate portion and socket being flattened in planes disposed substantially at right angles to each other, and a tension spring having an end coil anchored upon the shoulder formed between said two flattened portions.

18. In a fuse link, a pair of fuse terminals, a fusible section connecting said terminals, a sleeve of insulation surrounding said terminals and said section, and a corona and radiation shield inside said sleeve and spaced therefrom and surrounding said section, said corona and radiation shield being spaced from said fusible section with an air dielectric therebetween.

19. In a fuse link, a pair of fuse terminals, a fusible section connecting said terminals, a sleeve of insulation surrounding said terminals and said section, a corona and radiation shield inside said sleeve and surrounding said section, and a spring connected between said terminals to put said section under predetermined tension, the reaction of said spring being taken up through said sleeve in compression.

20. In combination with a fuse link comprising a first fuse terminal member, a second fuse terminal member, and a fusible element connecting said terminal members, a fiber tube having one end bound upon said first member, said member having a threaded stud projecting out of the end of the tube, a flexible lead connected to the second member, a spring connected between the second member and the tube to tension the element, and a fitting having a flanged head at one end, a flat intermediate portion, and a tubular threaded socket at the other end threaded upon said stud and constituting a terminal connector therefor.

21. In a fuse device, in combination, a fuse tube, a pair of terminal members inside said fuse tube, a strain element and a fusible element disposed to interconnect said terminal members, and a metal shield inside said fuse tube and connected to one of said terminal members and extending along and out of contact engagement with said strain and fusible elements.

22. In a fuse device, in combination, a fuse tube, a pair of terminal members, a strain element and a fusible element composed of silver and disposed to interconnect said terminal members, and a metal shield connected to one of said terminal members and extending along and slightly out of contact engagement with said strain and silver fusible elements with an air dielectric therebetween to protect said fuse tube from the heat radiated by said silver fusible element.

23. In a fuse device, in combination, a fuse tube, a pair of terminal members inside said fuse tube, a strain element and a fusible element disposed to interconnect said terminal members, and a tubular metallic radiation shield connected to one of said terminal members and surrounding said strain and fusible elements and slightly spaced therefrom with an air dielectric therebetween.

24. In a fuse device, in combination, a pair of terminal members, a strain wire interconnecting said terminal members, a fuse wire wrapped around said strain wire in close contact engagement therewith and also interconnecting said terminal members, and a metal shield connected to one of said terminal members and extending along and out of contact engagement with said strain and fuse wires.

25. In a fuse device, in combination, a pair of terminal members, a strain wire interconnecting said terminal members, a fuse wire wrapped around said strain wire in close contact engagement therewith and also interconnecting said terminal members, and a tubular metallic radiation and corona shield forming an extension of one of said terminal members and extending toward the other terminal member out of contact engagement with said strain and fuse wires.

26. In a fuse device, a stationary terminal, a fuse terminal attached thereto, said fuse terminal comprising a tubular metallic shield anchored to the stationary terminal, a fusible conductor also anchored to the stationary terminal and extending through the tubular member, a movable fuse terminal secured to the fusible conductor and being spaced from the tubular member to provide a spark gap for protecting the fusible member from surges.

27. In a liquid fuse, the combination of a fuse tube having a ferrule, a terminal anchorage carried by said ferrule, a first fuse terminal connected to the anchorage, a second fuse terminal, a fusible element between said first and second terminals, a liquid director connected to the second terminal, and a tubular shell mounted on said liquid director and defining an arcing chamber loosely surrounding the fusible member.

28. In a liquid fuse, the combination of a fuse tube having a ferrule, a terminal anchorage carried by said ferrule, a first fuse terminal connected to the anchorage, a second fuse terminal, a fusible element between said first and second terminals, and a tubular radiation shield integrally formed with one of said terminals and surrounding said fusible member, said shield approaching the other terminal to provide a safety gap between said terminals and in parallel with said fusible member.

29. In a liquid fuse, the combination of a fuse tube having a ferrule, a terminal anchorage carried by said ferrule, a first fuse terminal connected to the anchorage, a second fuse terminal, a fusible element between said first and second terminals, a tubular shell defining an arcing chamber loosely surrounding said fusible element, and a tubular radiation shield integrally formed with one of said terminals and surrounding said fusible member inside of said tubular shell, said shield approaching the other terminal to provide a safety gap between said terminals and in parallel with said fusible member.

30. In a fuse, a fusible element, fuse terminals connected to the ends of the fusible element, and conducting means connected to the fuse terminals and approaching each other to form a spark gap in parallel with the fusible element.

31. In a fuse device, in combination, a pair of terminal members, a fuse link interconnecting said terminal members, a flexible conductor attached to one of said terminal members, and means for permitting lost motion between a part of said conductor and the terminal member attached thereto.

32. In a fuse device, in combination, a pair of terminal members, a fuse link interconnecting said terminal members, means for mounting said fuse link in a fuse mounting including a flexible conductor disposed to be manually tensioned, and means for permitting a slight relative movement between a portion of said conductor and the terminal member to which it is attached.

33. In a fuse device, in combination, a fuse link having a substantially constant time-current fusing rating over a relatively great tension range on application thereto of a predetermined minimum tension, means for prestressing said link to said minimum tension, and means for limiting the maximum tension applied to said link.

34. In a fuse device, in combination a fuse wire having a minimum ultimate strength in tension of approximately twenty pounds and a substantially constant time-current fusing rating at any tension up to the application of said twenty pounds from a minimum tension of approximately four pounds, and means for constantly applying said tension of four pounds to said fuse wire.

35. In a fuse device, in combination, a metallic tubular fitting having one end pinched on a fuse wire and the other pinched on a flexible conductor, said pinched portions being disposed substantially at right angles to each other, and a tension spring having its end convolution closely engaging the base of the portion of said fitting pinched on said fuse wire and the next convolution surrounding the portion of said fitting pinched on said flexible conductor.

36. In a fuse device, in combination, a pair of terminals, a fusible element interconnecting said terminals, a flexible lead attached to one of said terminals, a retaining member secured to said flexible lead, and a helical spring interconnecting said terminal member to which said lead is attached and said retaining member, a convolution at one end of said spring being reduced to a diameter about the periphery of one of said last named members less than the outside diameter of the spring for non-rotative engagement therewith.

37. In a liquid fuse, the combination of a fuse tube having a ferrule, a terminal anchorage carried by said ferrule, a first fuse terminal connected to the anchorage, a second fuse terminal, a fusible element between said first and second terminals, a liquid director connected to the second terminal, and a tubular shell defining an arcing chamber loosely surrounding the fusible member, one of said terminal members having an integral tubular radiation shield surrounding the fusible member and approaching the other terminal member to provide a safety gap between the terminal members and in parallel with the fusible member.

38. In a fuse device, in combination, a fuse tube formed of a material liable to be injured when subjected to high temperature, a pair of terminals inside said fuse tube, a silver fusible section interconnecting said terminals, and a metal shield spaced from said silver fusible section to protect the inner surface of said fuse tube from the heat radiated by said silver fusible section.

39. In a fuse device, in combination, a fuse tube formed of a material liable to be injured when subjected to high temperature, a pair of terminals inside said fuse tube, a silver fusible section interconnecting said terminals, and a metal shield connected to one of said terminals and extending along and spaced from said silver fusible section to protect the inner surface of said fuse tube from the heat radiated by said silver fusible section under normal operating conditions.

40. A fuse link for completing a circuit between a pair of stationary line terminals comprising, in combination, a pair of fuse terminals one of which is adapted to be connected to one of said line terminals, a fusible section interconnecting said fuse terminals, an insulating tube supporting said one fuse terminal and surrounding said fusible section, a flexible lead interconnecting the other fuse terminal and the other line terminal, and a spring interposed between said tube and said other fuse terminal to place said fusible section under stress independent of the connections to said line terminals.

41. In a fuse device, a stationary terminal, a fuse terminal attached thereto, a fusible conductor anchored to said fuse terminal, a movable fuse terminal secured to said fusible conductor, and a metallic shield carried by one of said fuse terminals and extending toward the other fuse terminal to provide a spark gap for protecting said fusible conductor from surges.

42. In a liquid fuse, in combination, a fuse tube having a ferrule, a first fuse terminal connected to said ferrule, a second fuse terminal, a fusible element between said first and second terminals, and a tubular shell carried by said second fuse terminal and loosely surrounding said fusible element and defining an arcing chamber.

43. In a liquid fuse, a fusible element, fuse terminals connected to the ends of the fusible element, and conducting means carried by one of said fuse terminals and extending toward the other fuse terminal to provide a spark gap above the level of the liquid in the fuse for protecting said fusible element from surges.

44. A replaceable fuse link adapted for mounting in an insulating fuse housing of the expulsion type comprising, a pair of terminals, a fusible section interconnecting said terminals, spring means biasing said terminals apart, and a tubular metal corona shield extending from one of said terminals and surrounding said fusible section and being unstressed by said spring means.

45. A replaceable fuse link adapted for mounting with its fusible section entirely within an insulating fuse tube of the expulsion type comprising, a pair of terminals, a fusible section interconnecting said terminals, an insulating sleeve surrounding said fusible section and adapted to evolve an arc extinguishing medium under the action of the arc formed on blowing of said fusible section, and a tubular metal corona shield extending from one of said terminals and surrounding said fusible section.

46. A replaceable fuse link adapted for mounting with its fusible section entirely within an insulating fuse tube of the expulsion type comprising, a pair of terminals, a fusible section interconnecting said terminals, an insulating sleeve surrounding said fusible section, spring means biasing said terminals apart, and a tubular metal corona shield extending from one of said terminals toward the other terminal and surrounding said fusible section and being unstressed by said spring means.

47. A replaceable fuse link comprising, a pair of relatively infusible terminals, a fusible section interconnecting said terminals, and an inherently rigid metal shield extending from one of said terminals toward the other and surrounding said fusible section.

48. A replaceable fuse link comprising, a pair of relatively infusible terminals, a fusible section interconnecting said terminals, and an inherently rigid tubular metal shield surrounding said fusible section and extending from one of said terminals toward the other to form therewith a spark gap in parallel with said fusible section.

49. A replaceable fuse link comprising, an insulating sleeve, a relatively infusible terminal at one end of said sleeve, a conductor including a relatively infusible terminal and a flexible lead extending out of the other end of said sleeve, a fusible section electrically interconnecting said terminals, and an inherently rigid tubular metal shield surrounding said fusible section and extending from one of said terminals toward the other to form therewith a spark gap in parallel with said fusible section.

50. In a liquid fuse, a terminal for a fusible section positioned above the level of the liquid when the fuse is in an upright position, and a tubular metal corona shield for surrounding the fusible section, said shield extending downwardly from said terminal and having an aperture in its wall to prevent retention of the liquid within the shield when the fuse is in the upright position, whereby the predetermined time-current characteristic of the fusible section is not affected.

51. In a replaceable fuse link, in combination, a terminal member, an anchor member, a spring non-rotatively secured at its ends to said terminal and anchor members respectively, said members being spaced apart a predetermined distance whereby said spring is normally stressed, and a flexible lead mechanically interconnecting said members and of such length therebetween that it is substantially unstressed when they are spaced apart at said predetermined distance.

52. In a fuse, a fitting comprising a terminal and radiation shield member consisting of a first tubular portion adapted to embrace loosely a fusible section and a second tubular portion of smaller diameter than the first tubular portion adapted to be pinched upon one end of the fusible section.

53. A terminal for a renewable fuse link for rendering the same capable of being connected into fuse mountings of different types comprising, a head, and a flat shank, said flat shank being partially severed at the base of said head in the direction of its depth thus permitting subsequent detachment of said head to facilitate clamping to said shank, the shank being partially severed in such manner that the electrical conductivity between it and said head is only slightly reduced.

54. A terminal for a renewable fuse link for rendering the same capable of being connected into fuse mountings of different types comprising, a head, and a flat shank, said flat shank being partially severed in the direction of its depth thus permitting subsequent detachment of a portion of the shank to facilitate clamping, the shank being partially severed in such manner that the electrical conductivity of the terminal is only slightly reduced.

55. A terminal for a renewable fuse link for rendering the same capable of being connected into fuse mountings of different types comprising, a head, and a flat shank, said flat shank being provided with a generally U-shaped portion partially severed in the direction of its depth thus permitting subsequent detachment of this U-shaped portion to facilitate clamping, the shank being partially severed in such manner that the electrical conductivity of the terminal is only slightly reduced.

56. A renewable fuse link comprising, a fuse tube, a terminal at one end of said fuse tube, a conductor including a flexible lead extending out of the other end of said fuse tube, and fusible means interconnecting one end of said terminal and said conductor, said terminal having a flanged head at its other end and a flat portion intermediate its ends, said flat portion having a generally U-shaped section opening along one side and partially severed in the direction of its depth thus permitting subsequent detachment of this section to facilitate clamping, the section being partially severed from said flat portion in such manner that the electrical conductivity of the terminal is only slightly reduced.

57. A renewable fuse link comprising, a fuse tube, a terminal at one end of said fuse tube, a conductor including a flexible lead extending out of the other end of said fuse tube, fusible means interconnecting said terminal and said conductor, a threaded stud on said terminal, and a fitting having a flanged head at one end, a flat intermediate portion, and a tubular socket at the other end threaded upon said stud, said flanged head being characterized by being partially severed from said flat intermediate portion in the direction of its depth whereby it serves as an electrical connecting portion and may be removed to provide for clamping said intermediate portion to a flat contact surface.

58. In a renewable fuse link adapted for use in a drop-out fuse tube which is normally held in operative position by tension transmitted through the fuse link, in combination, means for imposing a minimum tension on the fusible section of the link whether or not it is mounted in the fuse tube, and means preventing said minimum tension being cumulative with the tension holding the fuse tube in operative position.

59. In a renewable fuse link adapted for use in a fuse tube under tension, means including a spring and a strut member cooperating to impose a minimum tension on the fusible section of the link before insertion in the fuse tube and arranged and adapted to prevent the tension externally applied to the link after being inserted in the fuse tube from further tensioning the fusible section until the externally applied tension exceeds said minimum tension.

60. In a dropout fuse device, in combination, a fuse housing arranged and adapted to be slammed to the circuit closed position; a renewable fuse link in said fuse housing including a fuse tube, a terminal at one end of said fuse tube, a flexible lead extending out of the other end of said fuse tube, fusible means interconnecting said terminal and said flexible lead, and spring means tensioning said fusible means in such manner that tension stress externally applied to said flexible lead is not cumulative with the tension applied by said spring means; said terminal and flexible lead being connected to said fuse housing in such manner as to hold the same latched in the circuit closed position, and a second spring cooperating with said fuse housing and restrained by said fuse link for unlatching the former on blowing of the latter.

61. In a dropout fuse device, in combination, a fuse housing arranged and adapted to be slammed to the circuit closed position, a renewable fuse link in said fuse housing including, a pair of terminals, a fusible section interconnecting said terminals, an insulating sleeve bearing against one of said terminals and extending over said fusible section and the other of said terminals, a flexible lead connected to said other terminal and extending out of said sleeve, and spring means interconnecting said sleeve and said other terminal in such manner as to provide a limited degree of lost motion between said other terminal and the portion of said flexible lead extending out of said sleeve; said one terminal and said flexible lead being connected to said fuse housing in such manner as to hold the same latched in the circuit closed position, said lost motion in said flexible lead permitting said fuse housing to be slammed to the latched position without substantially increasing the tension already applied to said fusible section, and a second spring cooperating with said fuse housing and restrained by said fuse link for unlatching the former on blowing of the latter.

62. A fuse device comprising conducting elements constituting a normal current-carrying path including a fuse link embodying a fusible element, and means providing an auxiliary path in shunt-circuit relation with said fusible element, said last-named means including a discharge path one electrode of which is a portion of said fuse link.

63. In a fuse link, an insulating sleeve, a pair of fuse terminals, a fusible element connecting said terminals, said sleeve being placed in compression transmitted to one of said terminals by tension in said fusible element, stress means connected to said other terminal and disengageably anchored by said sleeve reacting thereon toward said one terminal and placing said fusible element under predetermined tension, and a lead electrically connected to said other terminal and mechanically connected in series with said stress means whereby subjecting said lead to tension of a value within that exerted by said stress means is ineffective for altering the predetermined tension of said fusible element.

64. In a fuse link, an insulating sleeve, a pair of fuse terminals and a fusible element connecting them, said sleeve being placed in compression transmitted to one of said terminals by tension in said fusible element, a prestressed spring attached at one end to said other terminal and having its other end disengageably anchored to said sleeve, said spring reacting upon said sleeve toward said one terminal and cooperating with said sleeve for maintaining said fusible element under predetermined tension, and a lead anchored to said other end of said spring and having a flexible slack portion extending between its anchorage to said spring and said other terminal.

65. In a fuse link, an insulating sleeve, a pair of fuse terminals and a fusible element connecting them, said sleeve being placed in compression transmitted to one of said terminals by tension in said fusible element, a prestressed spring attached at one end to said other terminal and having its other end disengageably anchored to said sleeve, said spring reacting upon said sleeve toward said one terminal and cooperating with said sleeve for maintaining said fusible element under predetermined tension, and a lead electrically connected to said other terminal and mechanically connected in series with said spring whereby subjecting said lead to tension of a value within that exerted by said spring is ineffective for altering the predetermined tension of said fusible element.

66. In a fuse link, an insulating sleeve, a pair of fuse terminals, a fusible element connecting said terminals, and stress means effective for maintaining said fusible element under predetermined tension comprising a prestressed spring and a lead, with said lead electrically connected to one of said terminals and said stress means attached by disengageable anchorage means to one end of said sleeve, the latter being confined between said anchorage means and one of said terminals and constituting a compression member placed under compression by the reaction of said stress means, said spring and lead being mechanically connected in series providing non-cumulative stress means effective for maintaining said fusible element under predetermined tension whereby subjecting said lead to tension of a value within that exerted by said stress means is ineffective for altering the predetermined tension of said fusible element.

67. In a fuse link, an insulating sleeve, a pair of fuse terminals, a fusible element connecting said terminals, and stress means effective for maintaining said fusible element under predetermined tension comprising a prestressed compression spring confined between one of said terminals and one end of said sleeve and a lead, with said lead electrically connected to one of said terminals and said stress means attached by disengageable anchorage means to one end of said sleeve, the latter being confined between said anchorage means and one of said terminals and constituting a compression member placed under compression by the reaction of said stress means, said spring and lead being mechanically connected in series providing non-cumulative stress means effective for maintaining said fusible element under predetermined tension whereby subjecting said lead to tension of a value within that exerted by said stress means is ineffective for altering the predetermined tension of said fusible element.

68. In a fuse link, an insulating sleeve, a pair of fuse terminals, a fusible element connecting said terminals, and stress means effective for maintaining said fusible element under predetermined tension comprising a prestressed compression spring confined between one of said terminals and one end of said sleeve and a lead, with said lead electrically connected to said one terminal and said stress means attached by disengageable anchorage means to the other end of said sleeve, the latter being confined between said anchorage means and said one terminal and constituting a compression member placed under compression by the reaction of said stress means, said spring and lead being mechanically connected in series providing non-cumulative stress means effective for maintaining said fusible element under predetermined tension whereby subjecting said lead to tension of a value within that exerted by said stress means is ineffective for altering the predetermined tension of said fusible element.

69. In a fuse link, a balanced tension-compression system comprising, a fusible element adapted to be put in tension, a sleeve surrounding said element adapted to be put in compression, a prestressed spring interposed between one end of said element and the adjacent end of said sleeve to create tension in said element and compression in said sleeve, the other end of said element having means bearing against the adjacent end of said sleeve to take up the reaction of said spring, and a flexible lead which may be subjected to tension, said lead being connected to the balanced system at a point where tension put on said lead opposes the reaction of said spring whereby tension on said lead not exceeding the tension in said element imposed by said prestressed spring imposes no additional tension on said element.

SIGURD I. LINDELL.